2,940,747
ELECTRIC WEIGHING AND BALANCING SYSTEM
Harvey P. Eder and Leo V. Barrett, Milwaukee, Charles C. Monk, Cudahy, and Richard P. Oberlin, Brookfield, Wis., assignors to Eder Engineering Company, Inc., Milwaukee, Wis., a corporation
Filed Nov. 30, 1956, Ser. No. 625,316
1 Claim. (Cl. 265—70)

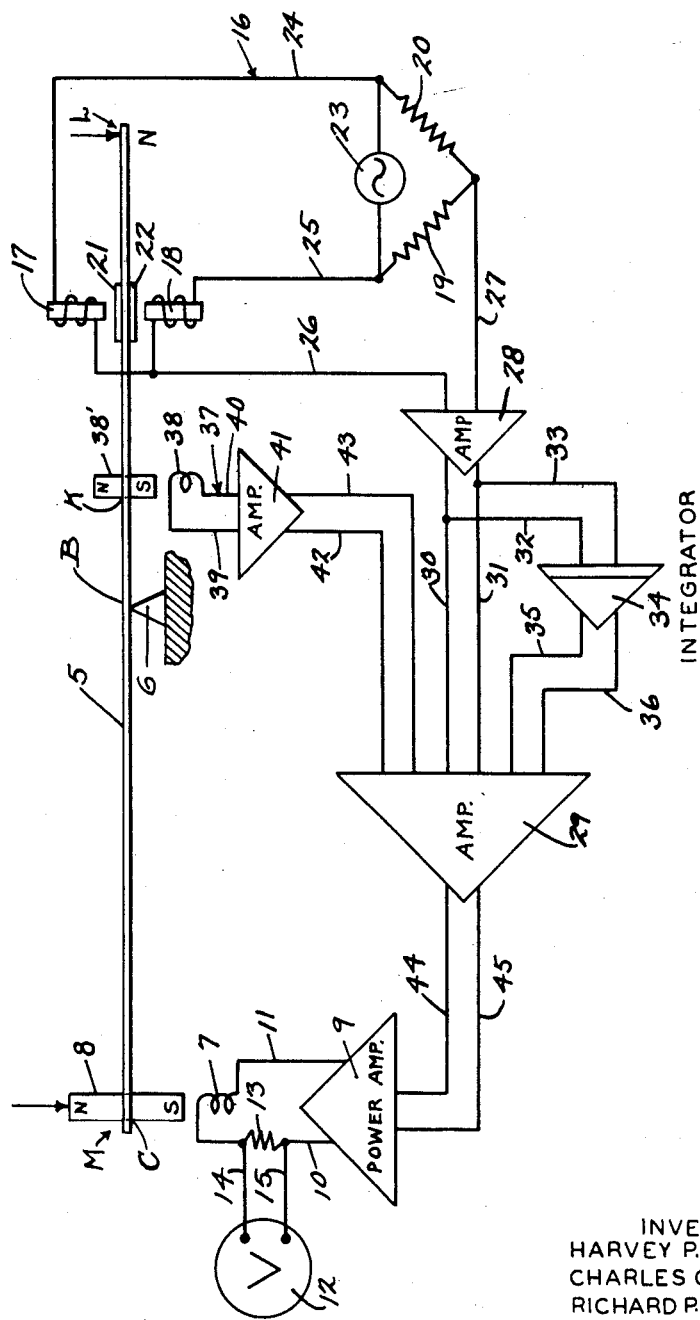

This invention appertains to weight measurement and, more particularly to a precision beam balance scale.

One of the primary objects of the invention is to provide a precision beam balance with electronic circuits utilized in a novel manner to give rapid and sensitive dampening of the movement of the beam and a rapid and accurate reading of the weight of the object being measured.

Another salient object of the invention is to provide a unique balancing system embodying electronic circuits for applying a force in the direction required to maintain the beam at a fixed point of balance, the force applied by the system being directly measurable in electric units, which can be used to indicate an application to the beam of weight, mass moment or torque.

With these and other objects in view the invention consists in the novel construction, arrangement and formation of parts, as will be hereinafter more specifically described, claimed and illustrated in the accompanying drawing, in which drawing:

The figure is a diagram of the electronic system utilized with a beam balance, the beam also being shown diagrammatically.

Referring to the drawing in detail, the system includes a balance arm or beam 5 rockably mounted on a pivot 6 forming a fulcrum B. A load L, the weight of which is to be measured, is adapted to be placed on one arm of the beam 5 and such load tends to move the beam in the direction of the arrow as indicated above the reference character N. Means is provided for resisting movement of the beam under influence of the load L and this means will be described. The resisting force is applied to the beam at a point indicated by the reference character M in the direction of the arrow also indicated by the reference character M. With a load at L, a torque LBN and a counter torque MBC, which is force M times distance BC are produced about fulcrum B. When LBN equals MBC the summation of torques about fulcrum B is zero and the beam 5 will not rotate. When LBN and MBC are not equal, the beam 5 will rotate in the direction of the greater torque.

As heretofore stated, the balance beam has only been shown diagrammatically and the load L can be an object, a mass moment or a force and that only one direction of load is shown for clarity, but that either direction can be used with corresponding effects.

The electromotive force or motor drive at the point M of the beam 5 consists of a stationary coil 7 in the magnetic field of a permanent magnet 8 attached to the beam 5 at the point M or the point of the beam remote from the end where load is applied. While we have shown the coil 7 stationary and the magnet 8 carried by the beam for movement therewith, it is obvious that these two parts can be interchanged, as may be desired. Current flowing through coil 7 will produce the force M proportional to the magnitude of the current and in the direction corresponding to the polarity of coil current. The coil 7 is connected with the output of a power amplifier 9 and wires 10 and 11 lead from the power amplifier and are connected to the opposite terminals of the coil 7. The power amplifier 9 takes a reversible D.C. signal from a high impedance source (as will later appear) and gives a reversible D.C. signal at the output with low internal impedance capable of energizing the coil 7. The reading for the force M consists of a volt meter 12 and a resistor 13 in series with the coil 7. The volt meter 12 is shunted across resistor 13 and is connected therewith by wires 14 and 15. Current flowing through coil 7 causes a voltage drop across resistor 13. The voltage is read on the volt meter 12.

Displacement or movement of the beam 5 under influence of a load L is utilized to unbalance a bridge circuit 16. The output from the bridge circuit 16, when amplified and fed to the coil circuit 7, applies a force to the beam 5 which moves the beam 5 in proper direction until the bridge circuit is in balance once again. The inductance bridge pickup or circuit 16 consists of two stationary iron core coils 17 and 18 and two resistors 19 and 20. Armatures 21 and 22 are secured to the beam 5 between the fulcrum B and the load L and these armatures are provided, respectively, for the iron core coils 17 and 18. Shunted across the resistors 19 and 20 is an oscillator 23 and wires 24 and 25 lead from the point of connection of the oscillator 23 with the bridge to the terminals of the coils 17 and 18 and the opposite terminals of these coils are connected to a common wire 26. At the point of connection of the resistors 19 and 20 is a wire 27 and the wires 26 and 27 lead to an amplifier 28. The bridge circuit 16 is excited by the oscillator 23 and produces an output when unbalanced. If the beam 5 moves from its horizontal position, the armatures 21 and 22 are moved closer to one coil 17 or 18 increasing its inductance and moving further from the other coil 17 or 18 decreasing its inductance. This unbalances the bridge and gives an output which is approximately proportional in magnitude to the displacement of the beam 5 from the horizontal. The output has a phase relationship corresponding to the direction of displacement of the balance beam 5.

The output of the amplifier 28 is connected to an amplifier 29 by wires 30 and 31. Connected to the wires 30 and 31 are wires 32 and 33 leading to an integrator 34 and the output of the integrator is connected by wires 35 and 36 to the amplifier 29. The amplifier 28 is of the type which takes a low level A.C. input signal and amplifies it to a suitable level and converts the A.C. signal to a phase reversible D.C. signal.

The integrator 34 is a D.C. amplifier which amplifies steady D.C. signals greatly and changing D.C. signals proportionately less. If a constant level D.C. signal is applied to the input, the output will rise a rate proportional to the signal until saturation is reached. The amplifier is chopper-stabilized to minimize drift. The integrator 34 can be a reversible D.C. motor excited from the input and driving a potentiometer arm as the output with one leg attached to negative voltage and the other to a positive voltage.

The dampening circuit or velocity pickup is indicated by the reference character 37 and includes a stationary coil 38 located in the magnetic field of a permanent magnet 38' attached to the beam 5 at some point K. The opposite terminals of the coil 38 are connected by wires 39 and 40 to an amplifier 41 and the output of the amplifier is connected by wires 42 and 43 to the amplifier 29. In practice the magnet 38' can be connected to either end of the beam 5. Any movement of the beam 5 induces a voltage in the coil 38. This voltage has a magnitude proportional to the velocity of the beam 5 and a polarity corresponding to the direction of the velocity of the beam 5. This voltage is fed into the amplifier 41 by wires 39 and 40 as heretofore set forth.

Amplifier 41 takes a small reversible D.C. signal and amplifies it to a suitable level. The amplifier used is chopper-stabilized to minimize drift.

As illustrated, the amplifier 29 takes the three D.C.

outputs from amplifiers 28, 41 and 34 and adds them together, without interaction, to give a single composite D.C. output. This output is applied to the power amplifier 9 by wires 44 and 45.

As is customary, power is supplied to the amplifiers from a 110 volt A.C. source.

In operation and assuming for starting point that the summation of the forces applied to beam 5 is zero; that is, no load L or force M is applied, and the beam 5 is horizontal. When a load is applied at L, the beam 5 will rotate in the direction of the load as indicated by the arrow at L and above N, since force M is zero.

The rotation of the beam 5 will move magnet 38' toward the coil 38 inducing a voltage in the coil. This voltage is amplified by amplifier 41, which causes a current to flow in coil 7 giving a force applied at M to the beam (as will later appear). This force which we shall designate as M' (to differentiate from other forces applied at M from other signals as will later appear), resists the movement of the beam 5 and by definition applies viscous damping to the system.

As the beam 5 moves from its horizontal position, the inductance bridge 16 is unbalanced (due to the movement of armature 22 toward coil 18 and the movement of armature 21 away from coil 17) giving an output which is amplified by amplifiers 28 and 29 and applied to amplifier 9, which causes a current to flow in coil 7 giving a force which is applied at M to the beam 5. This force, which we shall designate as $M^2$ tends to return the beam 5 to its horizontal position, however, a finite error voltage is required to produce a constant force at M to counteract the load L and the beam 5 will not return all the way to its horizontal position.

The integrator 34 gives an output which is the integral of its input which is the small error voltage amplified by amplifier 28. The output of the integrator keeps increasing and is amplified by amplifier 29. This output drives amplifier 9 which causes a current to flow in coil 7 producing a force which is applied to the beam 5 at M as heretofore stated. This force, which we shall designate as $M^3$, keeps increasing until the beam 5 returns to its horizontal position and thereby reducing the error voltage to zero. When the error voltage reduces to zero, the input to the integrator 34 is reduced to zero, which allows the output of the integrator to stay constant. The error force $M^2$ is adjusted to give a high natural frequency of oscillation to the beam 5 by controlling the gain of amplifier 28. The balancing force $M^3$ is controlled to give a response time on the order of several cycles of natural frequency of the beam 5 by adjusting the gain of the integrator 34. The dampening force M' is adjusted to damp out the oscillation of the balance beam 5 within the response time by adjusting the gain of amplifier 41. The beam 5 will then come to rest in its horizontal position in the response time.

Since the beam isn't moving, magnet 38' is stationary with respect to its coil 38 and, therefore, there is no induced voltage. When this voltage is zero, the force M' is also zero. With the beam 5 in its horizontal position, there is no error voltage and no force $M^2$. Since the error voltage is zero, the input to the integrator 34 is constant and, therefore, force $M^3$ is constant. The integrator therefore responds to and corrects for this error voltage.

The voltmeter 12 reads a voltage which is proportional to the current in the circuit for coil 7 and this is proportional to the force $M^3$ after balance is reached. The force $M^3$ is proportional to the load torque LBN and, therefore, the meter reading is proportional to LBN which has the units of mass moment or torque.

Thus it can be seen that when a force is applied by weight, mass moment or torque, the beam 5 tends to rotate in the direction of the force. The rotation of the beam 5 unbalances the bridge circuit 16. The output from the bridge circuit when amplified and fed to the electromotive drive, i.e. coil 7 and magnet 8, applies a force to the beam 5 which moves the beam 5 in proper direction until the bridge circuit is in balance once again. The system includes the electrical damping and the integrator control. The electrical damping system has a pickup which generates a signal. The signal output is amplified and the output of the amplifier is fed to the motor action drive which applies a force opposite to the force which causes the balance arm to move. Because of the characteristics of the system, external vibration effects and oscillation of the beam 5 are greatly reduced.

The integrator 34 makes up for a deficiency by controlling the output in such a way that a very small unbalancing of the bridge circuit 16 causes a large enough force to be applied to the beam 5 to return the bridge circuit to very nearly balance condition.

The force required to bring the beam 5 and, in turn, the ridge circuit into balance is directly proportional to the force applied to the beam. Indication of the force can be given on the volt meter 12 in scale reading or by digitized voltage output. This output can be used for automatic control.

Various changes in detail may be made in the system without departing from the spirit or the scope of this invention but what is claimed as new is:

We claim:

A balancing means for measuring weight, mass moment or torque comprising a balance beam adapted to receive a load at one end, a normally balanced bridge circuit adapted to be unbalanced by a beam movement and to give an output proportional in magnitude to the amount of such movement, an electromotive drive circuit for applying a force to the opposite end of the beam from the load and in a direction opposite to the movement of the load according to the output of the unbalanced bridge circuit, said bridge circuit including pickup coils disposed on opposite sides of the beam, an oscillator and a plurality of resistors, said pickup coils, oscillator and resistors being electrically connected, an amplifier connected to the output leads of the bridge circuit, armatures carried by the beam and arranged within the field of said pickup coils, a second amplifier, said first amplifier having its output terminals connected to the input terminals of said second amplifier, an integrator connected with the output terminals of said first amplifier, the output terminals of said integrator being connected to the input terminals of said second amplifier, a damping circuit for the beam including a stationary electric coil and a permanent magnet fixed to the beam, the field of said magnet surrounding said coil, a third amplifier connected in series with said coil, the output terminals of said third amplifier being connected to the input terminals of said second amplifier, said drive circuit including a power amplifier, the output terminals of said second amplifier being connected to the input terminals of said power amplifier, the output of said power amplifier being the input of said drive circuit, said drive circuit further including a stationary drive coil, a resistor in series with said coil, a voltmeter shunted across said resistor, a second permanent magnet fixed to said scale beam, the field of said second permanent magnet surrounding said drive coil, said resistor and drive coil being connected in series with the output terminals of said power amplifier.

References Cited in the file of this patent

UNITED STATES PATENTS

| | | |
|---|---|---|
| 2,371,040 | Fisher et al. | Mar. 6, 1945 |
| 2,620,657 | Stovall | Dec. 9, 1952 |
| 2,623,741 | Broekhuysen | Dec. 30, 1952 |
| 2,631,027 | Payne | Mar. 10, 1953 |
| 2,683,030 | Caule | July 6, 1954 |
| 2,685,200 | Slottow et al. | Aug. 3, 1954 |
| 2,734,736 | Payne | Feb. 14, 1956 |